Patented Oct. 6, 1931

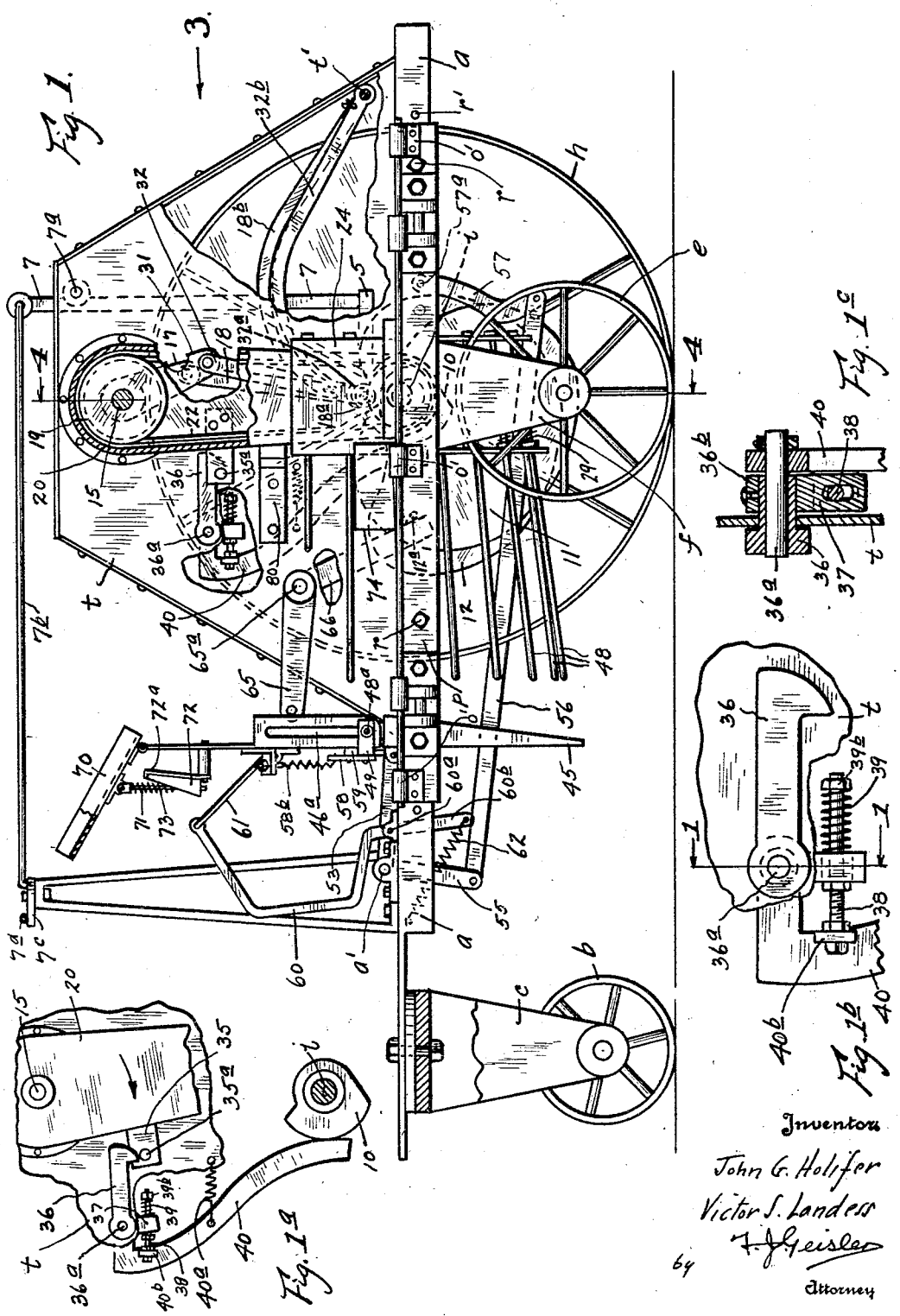

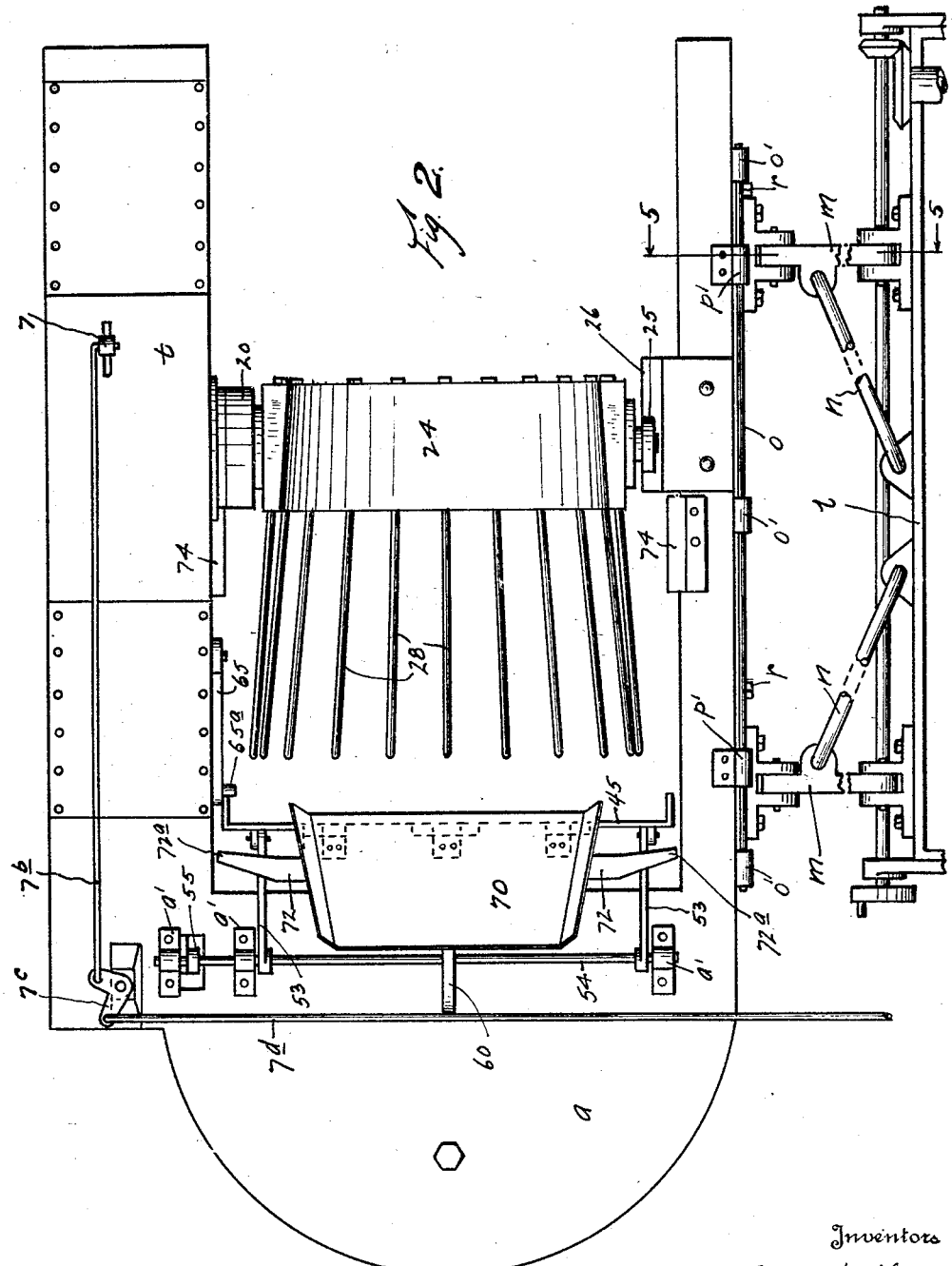

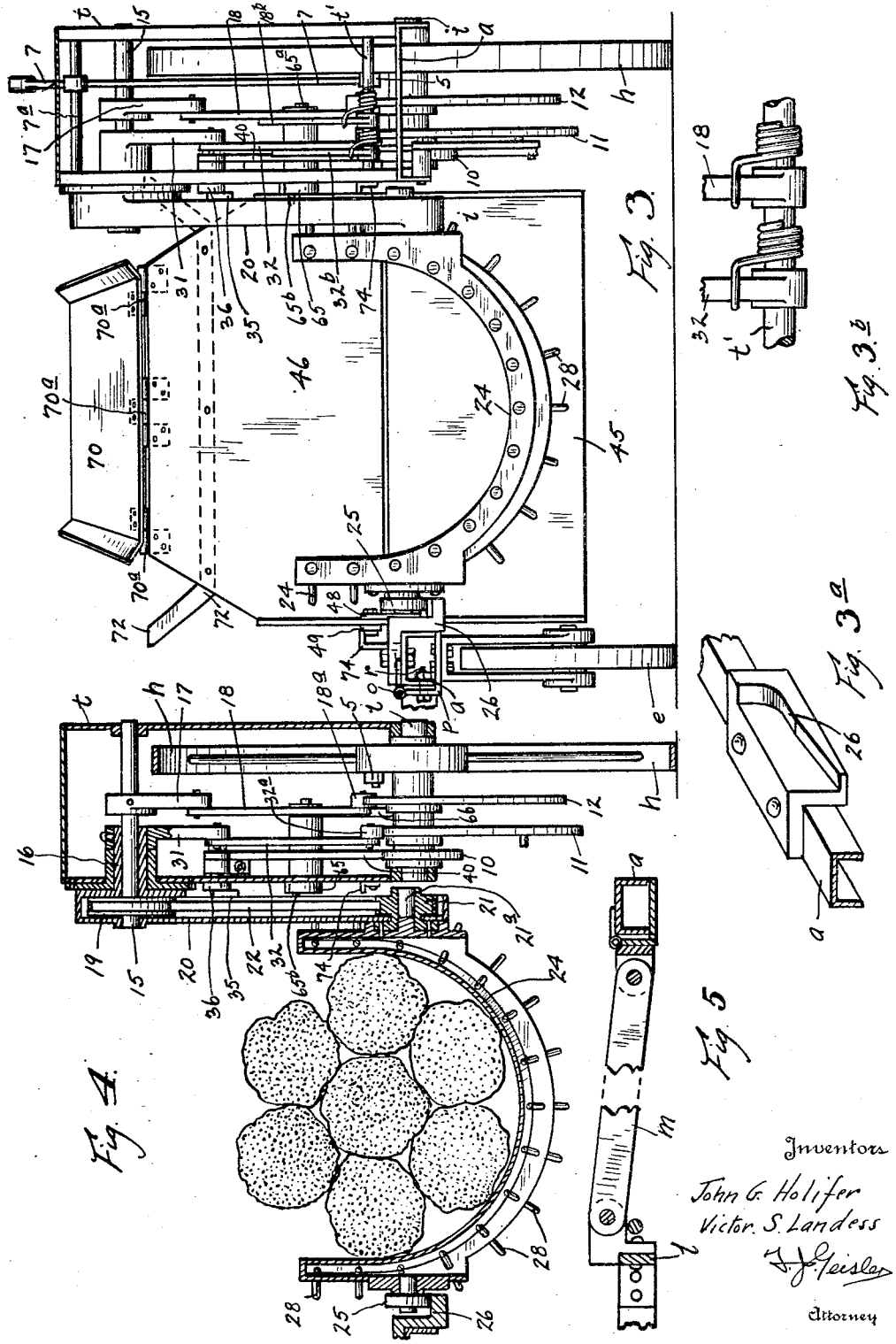

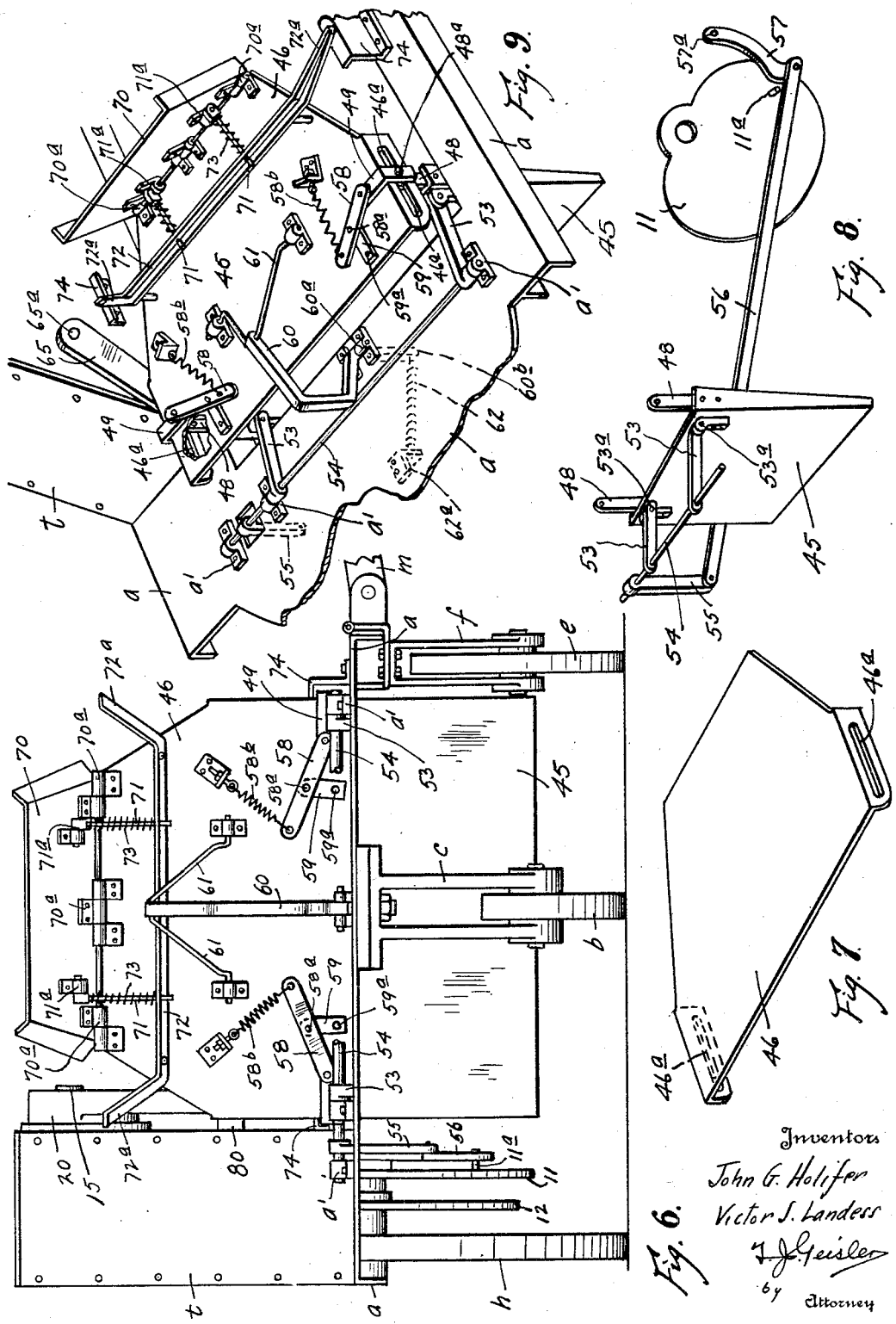

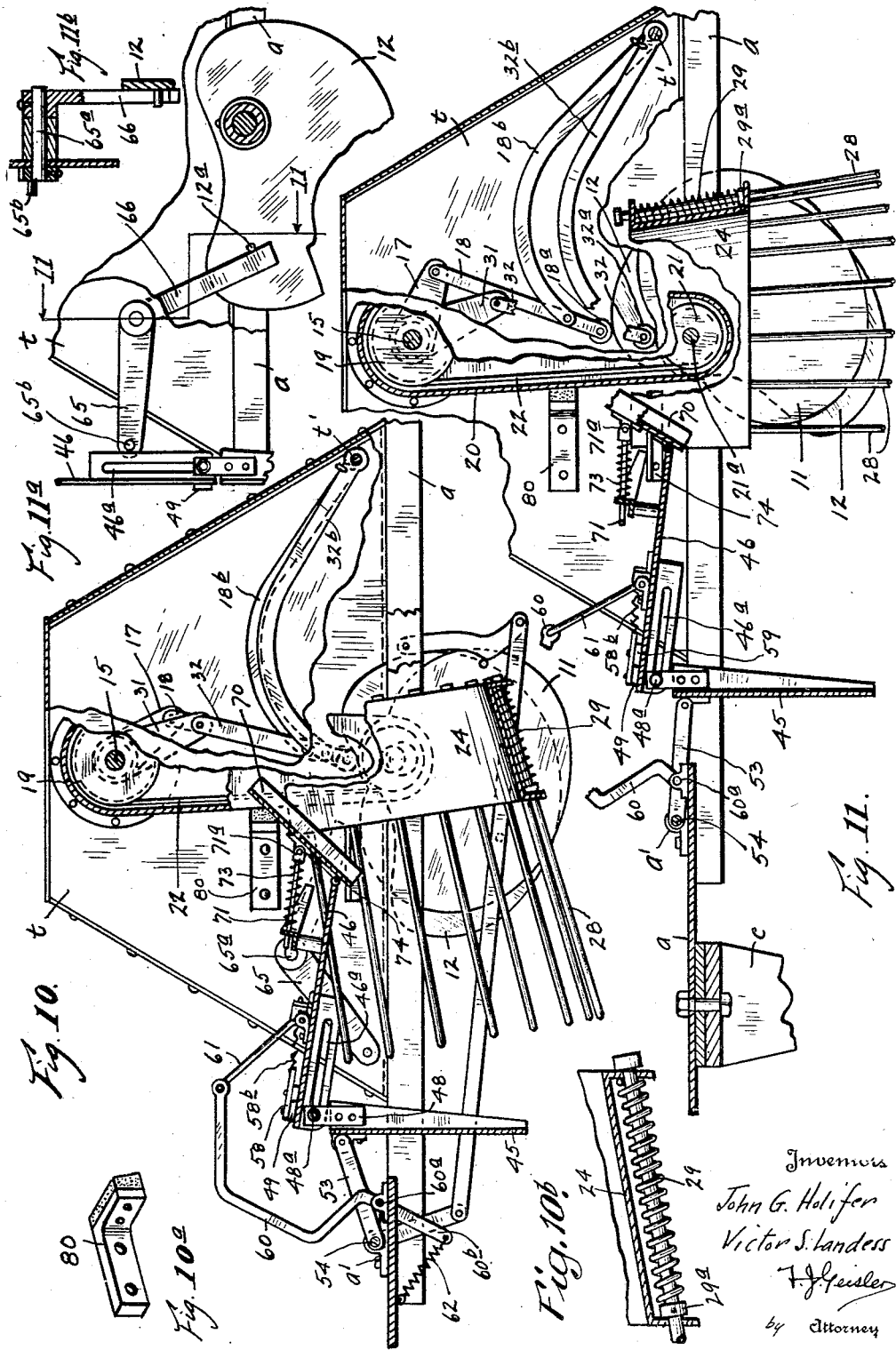

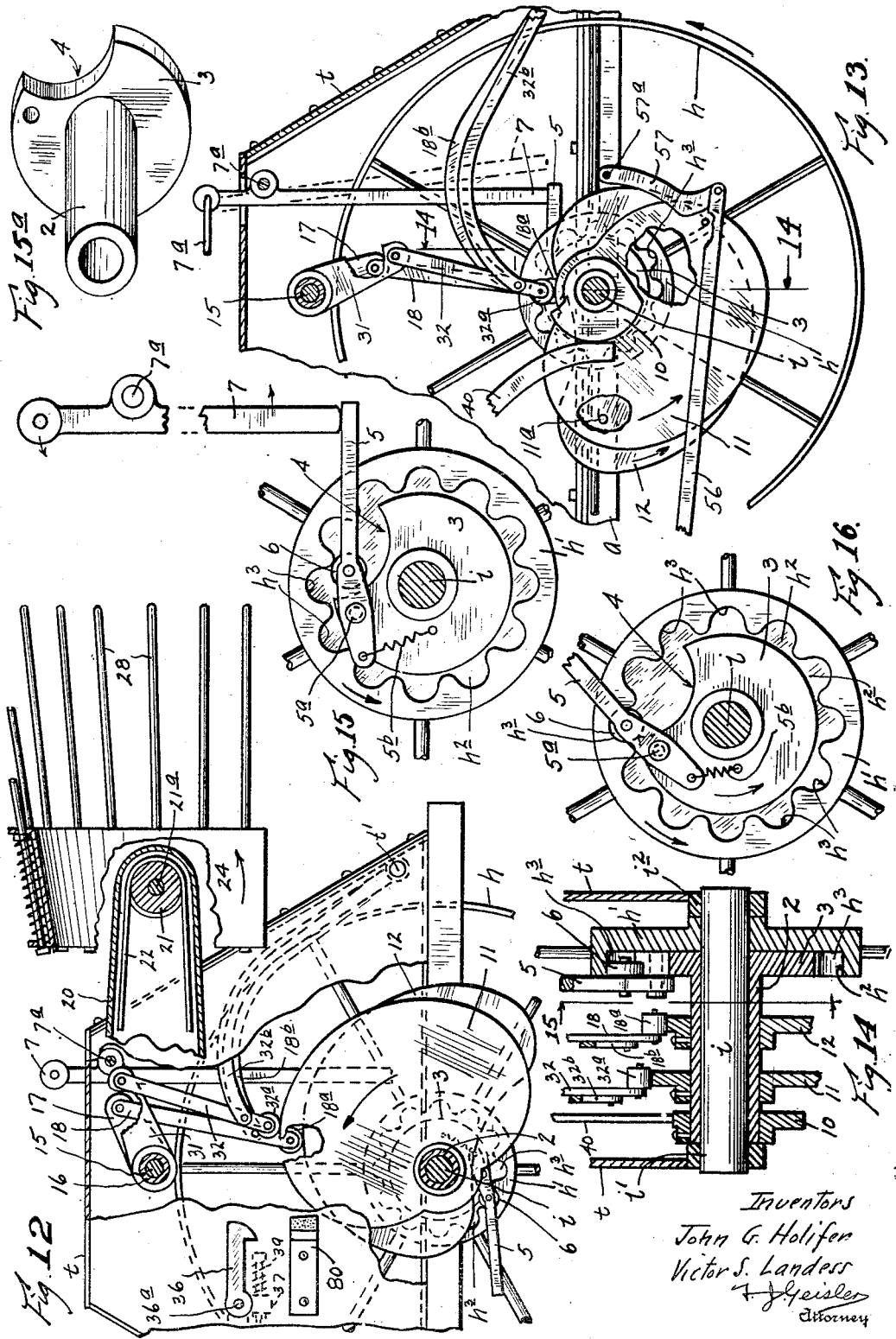

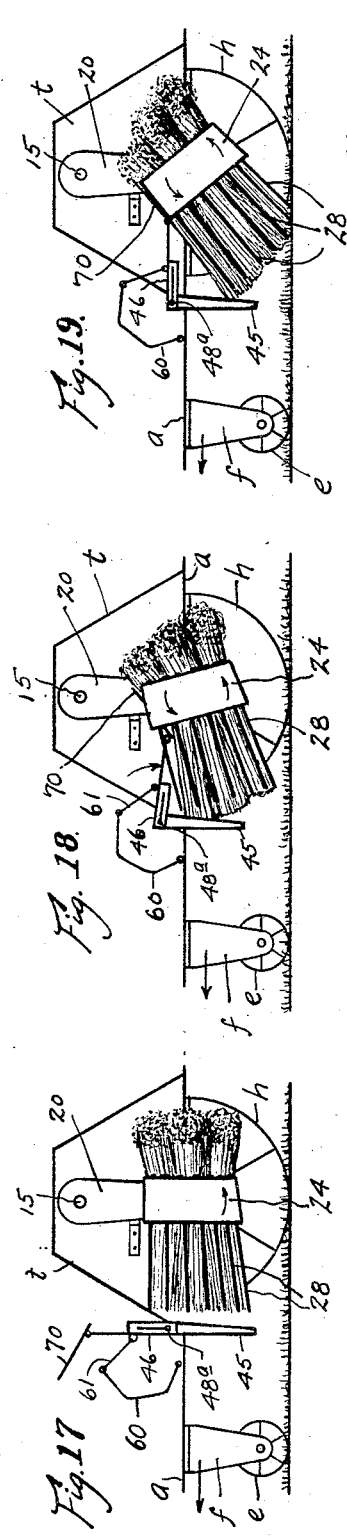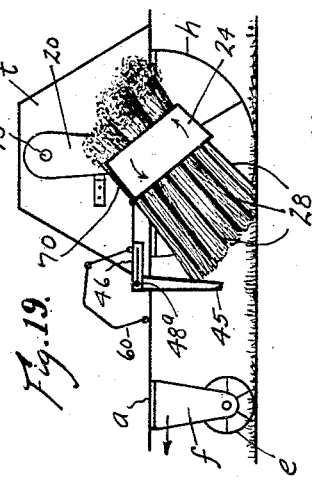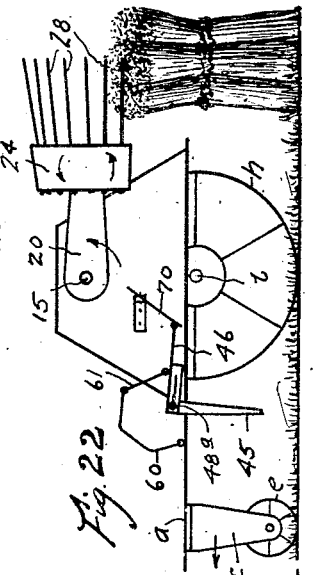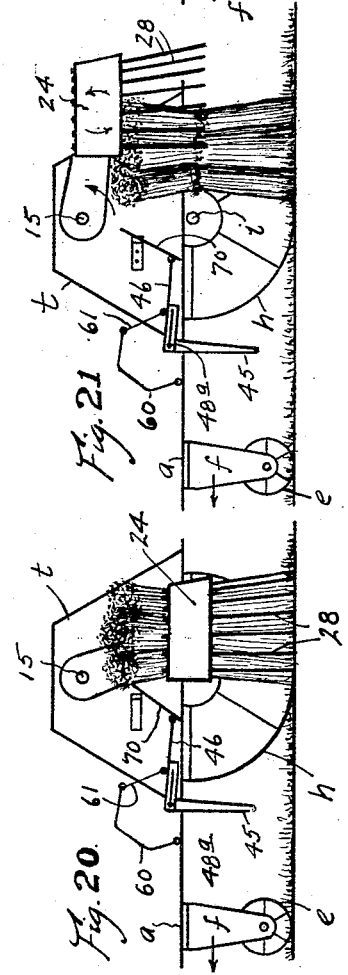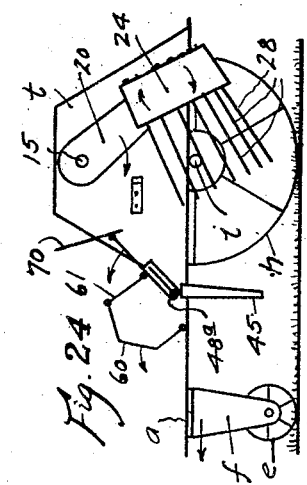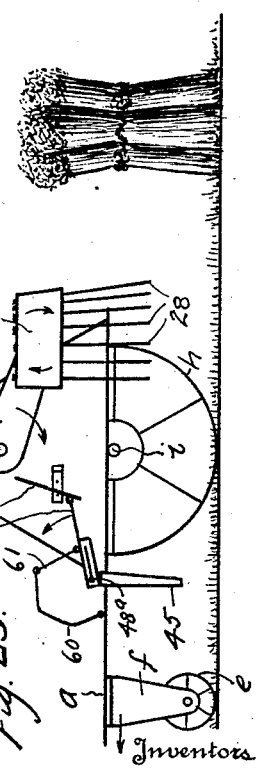

1,826,249

UNITED STATES PATENT OFFICE

JOHN G. HOLIFER AND VICTOR S. LANDESS, OF PORTLAND, OREGON, ASSIGNORS OF ONE-FOURTH TO EDWARD OWEN BLAZIER AND ONE-FOURTH TO HAROLD EMERY BLAZIER, BOTH OF PORTLAND, OREGON

BUNDLE SHOCKING MACHINE

Application filed October 7, 1929. Serial No. 397,932.

Our invention relates to machines for automatically piling or "shocking" bundles of wheat and the like as they are discharged from the "binding machine" when being harvested.

In harvesting of grain such as wheat and the like by means of the so-called binding machine which cuts and binds the grain into bundles and discharges them at intervals onto the ground as the machine progresses across a field, it is necessary that extra labor be employed to follow along after the said binding machine and collect the bundles and pile them into shocks.

The shocks usually consist of a number of bundles grouped together in vertical position with the heads of grain uppermost and with each bundle leaning slightly toward the center of the shock so as to support it in upright position.

This procedure is not only necessary to facilitate the gathering of the bundles for hauling to the stack, but it permits free circulation of air about the head of grain and prevents mildew or mold from accumulated moisture.

We have observed that of the shocks so piled by manual labor, about twenty-five per cent usually fall over which not only requires that they be re-piled, but the grain in them is liable to be injured by lying on the ground, for the reasons mentioned.

Furthermore, the grain is ordinarily slightly over ripe when havested and a considerable proportion of the kernels are beaten out of their husks and fall on the ground and are wasted, by the rough handling of the men, as the bundles are shocked, especially because in order to make the shock into a firm pile, the bundles are set forcibly on the ground on their butt ends so that the shock will be solidly formed.

Therefore the object of our invention is to provide a bundle shocking machine adapted to be attached to and used with the so-called binding machines, whereby the bundles, as they are received from the binding machine, will be deposited on the ground in solidly formed shocks of which approximately 90% will remain standing even under adverse conditions, such as during a high wind.

Another object of our invention is to provide a machine which will shock the bundles of grain so efficiently and smoothly that only a negligible quantity of kernels will be beaten or threshed out of their husks during its operation.

A further object of our invention is to provide a relatively simple and practical bundle shocking machine, the driving power of which will be derived from its own ground wheels and not taken from the binding machine, whereby no additional strain will be imposed upon the operating parts of the latter, which might tend to overload them with consequent damage to the machine.

We attain these and other incidental objects in a bundle shocking machine having a normally pendent, rotatable arm, a cradle carried by the free end of said arm, bundle holding devices adapted to hold and release the bundles depositing them in the cradle, and manually controlled means adapted to rotate the cradle into discharging position, and then to rotate the cradle arm rearwardly, with reference to the direction of travel of the machine, and upwardly after the cradle has assumed its discharging position; whereby the cradle is moved rearwardly away from and lifted over the discharged bundles during the continued forward motion of the machine, and finally to return all operated parts to their initial position and means effecting automatic release of said operating means after each cycle of operation.

By these means, the rearward rotation of the cradle to discharging position deposits the bundles gently on the ground to form the shock with a movement conforming with the forward motion of the machine, and then the movement of the cradle rearwardly and upwardly maintains the latter in contact with the bundles to steady the shock, just after it is deposited, since the cradle is lifted vertically relative to the shock, as the machine continues to move forward. In other words, the cradle is operated to cause the bundles to slide from it, and to be gently deposited on the ground; and, upon the completion of such deposit, the cradle is lifted over the shock, during the forward travel of the machine.

These objects and other incidental features of our invention and the details of construction and mode of operation thereof are hereinafter fully described with reference to the accompanying drawings.

In the drawings:

Fig. 1 shows a side elevation of our machine partly in section looking from the side adjacent to the binding machine when attached thereto;

Fig. 1a shows the details of the cradle arm holding devices;

Fig. 1b shows further details of the same;

Fig. 1c shows a section taken on the line 1—1 of Fig. 1b;

Fig. 2 shows a top plan view of our machine and illustrates how it is attached to the binding machine and the relative arrangement;

Fig. 3 shows an end view of our machine looking in the direction of the arrow 3 in Fig. 1;

Fig. 3a shows a perspective view of the supporting means for the free end of the cradle;

Fig. 3b shows the details of the spring actuated arms for holding the cam rollers on the cam;

Fig. 4 shows a section taken on the line 4—4 of Fig. 2;

Fig. 5 shows a section taken on the line 5—5 of Fig. 1 and illustrates the details of how our bundle shocking machine is connected to the binding machine;

Fig. 6 shows a front elevation of our machine and illustrates the construction and arrangement of the bundle holding apron;

Figs. 7 and 8 show details of construction of the apron and operating means therefor, respectively;

Fig. 9 shows a perspective view of the apron in its lowest position;

Fig. 10 shows a fragmentary side elevation partly in section of our machine and illustrates the cradle and the operating means therefor;

Fig. 10a shows the stop which limits the movement of the cradle;

Fig. 10b shows certain details of construction of the cradle rods;

Fig. 11 shows further details of construction of the cradle and its operating parts;

Fig. 11a shows the details of the apron operating means;

Fig. 11b shows a section taken on the line 11—11 of Fig. 11a;

Fig. 12 shows partly in section a further step in the operation of the cradle;

Fig. 13 shows a section taken on the line 13—13 of Fig. 4;

Fig. 14 shows a section taken on the line 14—14 of Fig. 13;

Fig. 15 shows a section taken on the line 15—15 of Fig. 14, and illustrates the engaging devices carried on the shaft of the driving ground wheel;

Fig. 15a shows a perspective view of the sleeve constituting part of the engaging devices;

Fig. 16 shows a similar view to Fig. 15 except that the said devices are in engaged position; and Figs. 17 to 24 inclusive, illustrate diagrammatically step by step the operation of our machine in forming a shock of grain bundles.

Referring now to the figures: Our bundle shocking machine consists of a U-shaped frame $a$, Figs. 1 and 2, horizontally supported on idling ground wheels $b$, $e$, the former journaled in a forked member $c$, pivotally secured to the central portion or front end of the frame $a$ and the latter journaled in a forked member $f$ secured to one side member of the frame $a$ on an angle iron $p$, slidably mounted on a bar $o$, in trunnion $p'$, the bar $o$ being secured to the frame $a$ as at $o'$. A driving ground wheel $h$ of relatively greater diameter is provided at the other side of the frame $a$ opposite to the wheel $e$, on a shaft $i$ journaled as at $i'$, $i2$.

The frame $a$ is adapted to be detachably and adjustably secured to the side of a binding machine of any standard type, represented at 1 in Fig. 2 by means of brackets $m$ and reinforcing brace rods $n$, carried on the angle iron $p$ on the side adjacent the wheel $e$. The angle iron $p$ being slidably mounted on the bar $o$, the frame $a$ may thus be positioned relatively to the center of the bundle discharging means of the binding machine and secured in such position by bolts $r$ insertable through a series of holes $r'$, $r2$ in the angle iron $p$ and the frame $a$.

To facilitate the description of our machine we will now briefly describe its functions, which consist of two parts; that of receiving the bundles of grain as they are discharged from the binding machine and then turning them with a combined rotative and arcuate movement, and depositing them upright on the ground to form the shock; and that of yieldingly holding the said bundles as they are turned and of releasing them before the shock is deposited on the ground, all of which we have illustrated in Figs. 17 to 24, inclusive. The means we have provided for carrying out these functions including the devices for holding the bundles are operated by the driving ground wheel $h$ and are inclosed and supported in a housing $t$, carried on the frame $a$ and inclosing the upper half of the driving ground wheel $h$.

We will now describe the bundle receiving and turning means including the means providing the combined rotative and arcuate movements thereof.

A sleeve 2, Figs. 14 and 15a, is rotatably mounted on the shaft $i$ between the journal bearing $i'$ and the wheel $h$, on which are mounted spiral driving cams 10, 11, 12. The said sleeve 2 is engageably connected with the wheel $h$ by means of a flange 3 integral therewith which seats in an annular recess $h2$, in the hub $h'$ of the said wheel. The recess $h2$ is provided with circumferential crenations $h3$, and the flange 3 with a concave notch 4. A lever 5 is pivotally connected to the flange as at $5a$ and is provided with a roller 6 adapted to engage in the crenations $h3$.

The other end of the lever 5 is normally held against the end of a lever 7 pivoted at $7a$ on the housing, by means of a spring $5b$, also by which the said roller 6 is held in engagement with the said crenations $h3$ when the lever 5 is out of engagement with the lever 7. The upper end of the lever 7 is connected by a rod $7b$, Fig. 2, to a bell crank lever $7c$ and a rod $7d$ to a convenient place by the operator's seat on the binding machine, not shown.

To cause the roller 6 to engage in the crenations $h3$ and hence operatively connect the wheel $h$ with the said sleeve, the lever 7 is moved in the direction shown by dotted lines in Fig. 13, by the rod $7d$, which releases the lever 5 so that the roller 6 will bear in an adjacent crenation $h3$ and interlock the sleeve 2 with the wheel $h$ when rotated in one direction, but when rotated in the other, the roller 6 will ride over the crenations and no movement will be transmitted. Thus the lever 5 rotates with the sleeve 2 when released, one complete revolution and then is stopped by the lever 7, one complete operation of the machine having taken place. A reverse rotation of the wheel $h$, however, as when the binding machine makes a turn, will not reverse the operation of the bundle shocking machine.

A shaft 15, Figs. 3 and 4, is mounted transversely in the upper part of the housing $t$, one end of which is journaled within a sleeve 16, hereinafter more fully described. An arm 17 is mounted fast on the shaft 15 and is connected at its outer end to a link 18 having a roller $18a$ on the other end which bears on and is held in contact with the cam 12 by means of a spring actuated arm $18b$ pivoted to the link 18 at one end and the housing $t$ as at $t'$ at the other. The end of the shaft 15 which projects through the sleeve 16 is provided with a pulley 19 which is housed in a hollow arm 20, integral with the said sleeve 16. The pulley 19 is connected with a pulley 21 by means of a belt 22, the pulley 21 being secured fast on a pin $21a$ journaled in the end of the said arm 20.

The outer end of the pin $21a$ is integral with a semi-cylindrical slightly flaring member 24. A roller 25 is provided on the other end of the member 24 in axial alinement with the pin $21a$, and normally rests on a curved ledge 26 on the adjacent side of the frame $a$.

The member 24 which flares toward the forward end of the machine when in its initial position, is provided with outwardly projecting, slightly diverging rods 28, Figs. 10 and 11, and thus forms a cradle for receiving the bundles of grain from the binding machine, see Fig. 4. The rods 28 are mounted in coil springs 29 arranged between upturned rims $24a$ on the member 24 and bear at one end against a stop $29a$ on the rod, and at the other against the said upturned rim of the member 24. By this construction, if the rods 24 strike against an obstruction, they will yield and thus not become bent or injured.

The said sleeve 16 on the shaft 15 is provided with an arm 31 pivotally connected to a link 32 which has on its other end a roller $32a$ which bears on, and is held in contact with the cam 11 by means of a spring actuated lever $32b$ also pivoted to the housing as at $t'$.

By this construction as the cam 12 is rotated by means of the ground wheel $h$, the cradle will be rotated clockwise, Figs. 17, 18 and 19, as the roller $18a$ rises over the cam 12, which movement is transmitted through the shaft 15 and the pulleys 19 and 21 to the pin $21a$ on which the cradle is mounted.

The cam 11 is so positioned relatively to the cam 12, that by the time the cradle has been rotated through approximately ninety degrees of arc, the roller $32a$ has risen on the cam 11 and transmitted through the sleeve 12 a clockwise turning movement, Figs. 20 to 22 inclusive, to the arm 20, which lifts the cradle simultaneously with its rotation, through an arc of approximately ninety degrees.

By the end of the movement of the arm 20, the cradle has been rotated through one hundred eighty degrees of arc, at which the highest points on the cams 11 and 12 are reached by the rollers $18a$ and $32a$ respectively and from then on the movements of the cradle and arm 20 are in a reverse direction to return the cradle to its initial position.

To prevent the arm 20 from possibly turning with the rotation of the shaft 15, Figs. 1 and 1a, we provide a forwardly projecting lug 35 on the arm 20 on which is a pin $35a$ engageable by a dog 36 carried on a pin $36a$, rotatably mounted in the side of the housing $t$. A lever 40 is also mounted on the pin $36a$ inside the housing $t$ and bears against the cam 10 and is held in contact therewith by a spring $40a$.

The dog 36, Figs. 1a, 1b, is freely mounted on the pin $36a$ on a sleeve $36b$ which projects through the housing $t$ and has a lug 37 secured thereto. A bolt 38 is loosely mounted in the said lug, the head of which is secured to the adjacent portion of the arm 40 as at $40b$. A spring 39 mounted on the bolt 38 between the lug 37 and the end, is held thereon by a nut $39b$.

By this construction the dog is automatically engageable with the pin 35a but releasable by the action of the lever 40. Thus the arm 20 will not be released by the dog 36 until the lever 40 is lifted by the cam 10, which is so relatively positioned to the cam 11 that this will not occur until the cradle has been rotated through the said ninety degrees of arc.

The means comprising the bundle holding devices of our machine, see Figs. 6 to 9, inclusive, consist of a transversely arranged vertical apron 45 mounted in the central portion of the frame a, in front of the cradle, on arms 53 pivoted at each end as at 53a, which are fast on a transverse rod 54 rotatably secured on the frame a as at a'. A lever 55 is fastened to the said rod at one end and extends downwardly through the frame a and carries on its other end a rod 56, Figs. 8 and 13, pivotally connected to a curved lever 57, pivoted on the housing t at 57a adjacent the cam 11 so as to bear, in certain positions of the cam, against a pin 11a provided on the side of the cam so that as the cam rotates the lever 57 is oscillated and the apron 45 is moved vertically up and down by the arms 56.

A supplementary apron 46 is hingedly connected to the upper edge of the apron 45 on laterally extending pins 48a carried on upright lugs 48 which ride in elongated grooves 46a in the lower corners of the said supplementary apron. Angular levers 49 are pivotally secured to the pins 48a and are pivotally connected at their other ends to links 58 centrally pivoted as at 58a on links 59. The other ends of the link 59 are pivoted to the apron 46 as at 59a and the other ends of the links 58 are connected to springs 58b carried on the apron 46 which is thus normally held so that the pins 48 rest in the lower ends of the grooves 46a.

An angular lever 60 is vertically and pivotally mounted in the frame a as at 60a, the upper portion of which is hingedly connected to the apron 46 by forked links 61, and the lower end 60b of which projects through the frame a, and is connected by a spring 62 to the underside of the said frame as at 62a, so that the apron 46 is normally held in the position shown in Figs. 9 and 10.

A lever 65, see Figs. 10, 11a and 11b, is mounted at one end on a pin 65a rotatable in the side of the housing t and bearing at its other end against the apron 46, the apron 46 being held in contact therewith by the lever 60 and spring 62. A lever 66 is mounted at one end on the pin 65a within the housing t and its other end bears against a pin 12a on the side of the cam 12. By this construction while the apron 46 is normally in the lower position shown in Fig. 10, the rotation of the cam 12 in certain positions raises the apron 46 to the position shown in Fig. 1.

An extension 70 is hinged to the apron 46 as at 70a and is normally held in angular relation, see Figs. 6 and 9, to the apron 46 by means of pins 71 pivotally secured to the extension as at 71a, and projecting through a transverse bar 72, the pins 71 having coil springs 73 mounted over them between the extension 70 and the rod 72. The ends 72a of the rod 72 project beyond the sides of the supplementary apron 46 and rest when in the lower position of the apron on oppositely arranged stops 74 carried at each side of the apron on the frame a.

A stop 80, Figs. 10 and 10a, is provided on the outside of the housing t, serving to limit the reverse movement of the cradle when it is returned to its initial position.

In the operation of our bundle shocking machine, the usual bundle dumping cradle on the side of the binding machine, not shown, having been removed, the frame a is secured thereto as shown in Fig. 2 with the cradle in its initial position as shown in Fig. 17, then when the cradle has become filled with bundles of grain x, Fig. 4, the lever 5 is disengaged from the lever 7 by the operator of the binding machine, by means of the rod 7c, and the roller 6 on the lever 5 engages a crenation h3 in the recess h2 of the wheel h which causes the sleeve 2 and the cams 10, 11 and 12 to rotate with the driving ground wheel h as the frame a is pulled along by the binding machine.

The rotation of the cam 12 turns the cradle clockwise about its axis through an arc of approximately ninety degrees and at the same time the pin 12a on the cam 12 has tripped the lever 60 and permitted the apron 46 to fall forward onto the bundles to hold them in the cradle by the action of the springs 58b and 62. Simultaneously the pin 11a on the cam 11 has actuated the lever 57 to raise the apron 55 vertically and draw it slightly away from the cradle in order to accommodate the ends of the bundles as the cradle is rotated. Furthermore, the yielding pressure of the apron 46 and extension 61 on the bundles, because of the levers 58 and 60 and springs 58b and 62 cause the bundles to be crowded together at their tops to form a more or less homogeneous mass and to form a shock which will stand upright and be self-sustaining when placed on the ground.

After the cradle has been rotated approximately ninety degrees the cam 10 causes the dog 36 to release the arm 20 so that it turns clockwise from the action of the cam 11, Figs. 20 to 22 inclusive, and raises the cradle, releasing the shock of grain bundles so formed and leaving them standing on the ground, Fig. 20. The movement of the cradle is then reversed and continues until the lever 5 has made a complete revolution and again bears against the lever 7 which disengages the sleeve 2 from the wheel h, and one complete operation of the machine has been completed, Figs. 23 and 24; the aprons 45 and 46 also having been returned to the position shown in Fig. 17.

We claim:

1. In a bundle shocking machine a frame, a rotatable arm normally pendent carried by the frame, a cradle rotatably carried by the free end of said arm, manually controlled operating means adapted to rotate the cradle into its discharging position, and to rotate said cradle arm rearwardly with reference to the direction of travel of the machine, and upwardly after the cradle has assumed its discharging position, thereby to move the cradle rearwardly away from and lift the same over the discharged bundles during the continued forward motion of the machine, and finally to return all operated parts to their initial positions.

2. In a bundle shocking machine comprising a frame, a rotatable arm normally pendent carried by the frame, a cradle rotatably carried by the free end of said arm, manually controlled operating means adapted to rotate the cradle into its discharging position, and to rotate said cradle arm rearwardly with reference to the direction of travel of the machine, and upwardly after the cradle has assumed its discharging position, thereby to move the cradle rearwardly away from and lift the same over the discharged bundles during the continued forward motion of the machine, and finally to return all operated parts to their initial positions, means effecting an automatic release of said operating means after each cycle of operation.

3. A bundle shocking machine comprising a frame, a rotatable arm normally pendent carried by the frame, a cradle rotatably carried by the free end of said arm, bundle holding devices adapted in certain positions of the cradle to hold and release again the bundles deposited in the cradle, manually controlled operating means adapted to rotate the cradle into its discharging position, and simultaneously to operate the bundle holding device, and to rotate said cradle arm rearwardly with reference to the direction of travel of the machine, and upwardly after the cradle has assumed its discharging position, thereby to move the cradle rearwardly away from and lift the same over the discharged bundles during the continued forward motion of the machine, and finally to return all operated parts to their initial positions.

4. A bundle shocking machine comprising a frame, a rotatable arm normally pendent carried by the frame, a cradle rotatably carried by the free end of said arm, bundle holding devices adapted in certain positions of the cradle to hold and release again the bundles deposited in the cradle, said bundle holding devices being yieldable, thereby adapted to hold bundles of different sizes without undue pressure, manually controlled operating means adapted to rotate the cradle into its discharging position, and simultaneously to operate the bundle holding device, and to rotate said cradle arm rearwardly with reference to the direction of travel of the machine, and upwardly after the cradle has assumed its discharging position, thereby to move the cradle rearwardly away from and lift the same over the discharged bundles during the continued forward motion of the machine, and finally to return all operated parts to their initial positions.

5. A bundle shocking machine comprising a frame, a rotatable arm normally pendent carried by the frame, a cradle rotatably carried by the free end of said arm, bundle holding devices adapted in certain positions of the cradle to hold and release again the bundles deposited in the cradle, manually controlled operating means adapted to rotate the cradle into its discharging position, and simultaneously to operate the bundle holding device, and to rotate said cradle arm rearwardly with reference to the direction of travel of the machine, and upwardly after the cradle has assumed its discharging position, thereby to move the cradle rearwardly away from and lift the same over the discharged bundles during the continued forward motion of the machine, and finally to return all operated parts to their initial positions, means effecting an automatic release of said operating means after each cycle of operation.

6. A bundle shocking machine comprising a frame, a rotatable arm normally pendent carried by the frame, a cradle rotatably carried by the free end of said arm, bundle holding devices adapted in certain positions of the cradle to hold and release again the bundles deposited in the cradle, said bundle holding devices being yieldable, thereby adapted to hold bundles of different sizes without undue pressure, manually controlled operating means adapted to rotate the cradle into its discharging position, and simultaneously to operate the bundle holding device, and to rotate said cradle arm rearwardly with reference to the direction of travel of the machine, and upwardly after the cradle has assumed its discharging position, thereby to move the cradle rearwardly away from and over the discharged bundles during the continued forward motion of the machine, and finally to return all operated parts to their initial positions, means effecting an automatic release of said operating means after each cycle of operation.

7. A bundle shocking machine comprising a wheel mounted frame, a series of cams rotatably mounted as a unit on the axle of one of said wheels, manually controlled means connecting said cam unit with one wheel of said axle, a shaft journaled in said frame, an arm rotatably mounted on said shaft, a cradle rotatably carried by the outer end of said arm, an operating connection between said shaft and one of said cams adapted to rock said shaft, means to rotate said cradle from said shaft into its discharging position, means for holding said arm in one position during the initial rotation of the cradle, means also actuated by one of said cams, adapted to release said arm-holding means after said rotation of the cradle, and an operating connection between said arm and one of said cams, adapted to rotate said arm, thereby to move said cradle in an arcuate path rearwardly from and over the discharged bundles, means effecting an automatic release of said operating means after each cycle of their operation.

8. A bundle shocking machine comprising a wheel mounted frame, a hollow axle rotatably mounted on the axle of one wheel, a series of cams carried by said hollow axle, manually controlled means connecting said hollow axle with one wheel of said axle, a shaft journaled in said frame, an arm rotatably mounted on said shaft, a cradle rotatably carried by the outer end of said arm, an operating connection between said shaft and one of said cams adapted to rock said shaft, means to rotate said cradle from said shaft into its discharging position, means for holding said arm in one position during the initial rotation of the cradle, means also actuated by one of said cams, adapted to release said arm-holding means after said rotation of the cradle, and an operating connection between said arm and one of said cams, adapted to rotate said arm, thereby to move said cradle in an arcuate path rearwardly from and over the discharged bundles, means effecting an automatic release of said operating means after each cycle of their operation.

9. A bundle shocking machine comprising a wheel mounted frame, a series of cams rotatably mounted as a unit on the axle of one of said wheels, manually controlled means connecting said cam unit with one wheel of said axle, a shaft journaled in said frame, a housing on said frame enclosing said shaft and said cam connections, an arm rotatably mounted on said shaft, a cradle rotatably carried by the outer end of said arm, an operating connection between said shaft and one of said cams adapted to rock said shaft, means to rotate said cradle from said shaft into its discharging position, means for holding said arm in one position during the initial rotation of the cradle, means also actuated by one of said cams, adapted to release said arm-holding means after said rotation of the cradle, and an operating connection between said arm and one of said cams, adapted to rotate said arm, thereby to move said cradle in an arcuate path rearwardly from and over the discharged bundles, means effecting an automatic release of said operating means after each cycle of their operation.

10. A bundle shocking machine comprising a wheel mounted frame, a series of cams rotatably mounted as a unit on the axle of one of said wheels, manually controlled means connecting said cam unit with one wheel of said axle, a shaft journaled in said frame, an arm rotatably mounted on said shaft, a cradle rotatably carried by the outer end of said arm, an operating connection between said shaft and one of said cams adapted to rock said shaft, means to rotate said cradle from said shaft into its discharging position, bundle holding devices cooperating with said cradle, and operated by cams, means for holding said arm in one position during the initial rotation of the cradle, means also actuated by one of said cams, adapted to release said arm-holding means after said rotation of the cradle, and an operating connection between said arm and one of said cams, adapted to rotate said arm, thereby to move said cradle in an arcuate path rearwardly from and over the discharged bundles, means effecting an automatic release of said operating means after each cycle of their operation.

11. In a bundle shocking machine, a wheel mounted frame, a cradle element rotatably mounted in said frame on a movable support, said cradle constituting a bundle holder, and operative connections between one wheel and said cradle and its said movable support, adapted first to rotate said cradle to discharge the bundles loaded therein and then to move said cradle through an arcuate path rearwardly from and over the discharged bundles.

12. In a bundle shocking machine, a wheel mounted frame, a cradle element rotatably mounted in said frame on a movable support, said cradle constituting a bundle holder, and operative connections between one wheel and said cradle and its said movable support, adapted first to rotate said cradle to discharge the bundles loaded therein and then to move said cradle through an arcuate path rearwardly from and over the discharged bundles, said cradle comprising a body and longitudinally yielding fingers.

13. In a bundle shocking machine, a wheel mounted frame, a cradle operatively mounted in said frame, operative connections between one wheel and said cradle, said operating connections including an annular series of internal cams provided on the hub of said wheel, a disk carried by the axle of said wheel, a spring controlled lever pivoted on said disk, and a member carried by the lever adapted to be engaged by one of said cams when said wheel is rotated in one direction, said disk being recessed to permit said roller to be moved out of said cams in the reverse rotation of said wheel.

14. In a bundle shocking machine, a wheel mounted frame, a cradle operatively mounted in said frame, operative connections between one wheel and said cradle adapted first to rotate said cradle to discharge the bundles loaded therein and then to move said cradle through an arcuate path rearwardly from and over the discharged bundles, said operating connections including an annular series of internal cams provided on the hub of said wheel, a disk carried by the axle of said wheel, a spring controlled lever pivoted on said disk, and a member carried by the lever adapted to be engaged by one of said cams when said wheel is rotated in one direction, said disk being recessed to permit said roller to be moved out of said cams in the reverse rotation of said wheel.

15. In a bundle shocking machine, a wheel mounted frame, a cradle operatively mounted in said frame, operative connections between one wheel and said cradle adapted first to rotate said cradle to discharge the bundles loaded therein and then to move said cradle through an arcuate path rearwardly from and over the discharged bundles, said cradle comprising a body and longitudinally slidable spring-controlled fingers, said operating connections including an annular series of internal cams provided on the hub of said wheel, a disk carried by the axle of said wheel, a spring controlled lever pivoted on said disk, and the lever adapted to be engaged by one of said cams when said wheel is rotated in one direction, said disk being recessed to permit said roller to be moved out of said cams in the reverse rotation of said wheel.

16. In a bundle shocking machine, a wheel mounted frame, a cradle operatively mounted in said frame, operative connections between one wheel and said cradle, said operating connections including an annular series of internal cams provided on the hub of said wheel, a disk carried by the axle of said wheel, a spring controlled lever pivoted on said disk, and a roller on the lever adapted to be engaged by one of said cams when said wheel is rotated in one direction, said disk being recessed to permit said roller to be moved out of said cams in the reverse rotation of said wheel.

17. In a bundle shocking machine, a wheel mounted frame, a cradle element operatively mounted in said frame, said cradle constituting a bundle carrier, operative connections between one wheel and said cradle element adapted first to rotate said cradle to discharge the bundles loaded therein and then to move said cradle through an arcuate path rearwardly from and over the discharged bundles, means effecting the automatic release of said cradle operating mechanism after each cycle of operation.

18. In a bundle shocking machine, a wheel mounted frame, a cradle operatively mounted in said frame, manually controlled mechanism operatively connected with one of the wheels and said cradle, devices for holding the bundles in said cradle in certain positions of the latter, means operating to release said cradle operating mechanism after each cycle of the cradle's operation and simultaneously to return the bundle holding means to their initial position.

19. In a bundle shocking machine, a wheel mounted frame, a cradle operatively mounted in said frame, manually controlled mechanism operatively connected with one of the wheels and said cradle, devices for yieldingly holding the bundles in said cradle in certain positions of the latter, means operating to release said cradle operating mechanism after each cycle of the cradle's operation and simultaneously to return the bundle holding means to their initial position.

20. In a bundle shocking machine a wheel mounted frame, a cradle operatively mounted in said frame, manually controlled mechanism operatively connected with one of the wheels, devices for holding the bundles in said cradle in certain positions of the latter, said devices comprising jointedly connected members, one arranged to hold the bundles from sliding out of the cradle and another to bear yieldingly down on said bundles, means operating to release said cradle operating means after each cycle of the cradle's operation and simultaneously to return the bundle holding means to their initial position.

21. In a bundle shocking machine a wheel mounted frame, a cradle operatively mounted in said frame, manually controlled mechanism operatively connected with one of the wheels, adapted first to rotate said cradle to discharge the bundles loaded therein, and then to move said cradle through an arcuate path rearwardly from and over the discharged bundles, devices for yieldingly holding the bundles in said cradle in certain positions of the latter, means operating to release said cradle operating means after each cycle of the cradle's operation and simultaneously to return the bundle holding means to their initial position.

22. In a bundle shocking machine, a wheel mounted frame, a cradle operatively mounted in said frame, said cradle comprising a concaved body, having a series of slidably mounted, spring-controlled fingers, a manually controlled operative mechanism adapted first to rotate said cradle into position to discharge the bundles loaded therein, and then to move said cradle through an arcuate path rearwardly from and over the discharged bundles, and means effecting an automatic release of said operative mechanism after each cycle of operation of said cradle.

23. In a bundle shocking machine, a cradle constituting a unitary bundle holder mounted for rotation about a movable axis, manually controlled mechanism operating first to rotate said cradle about its axis to discharge the bundles and then to move the said axis rearwardly, with reference to the direction of travel of the machine, and upwardly to clear the discharged bundles, and finally returning the cradle to its bundle-receiving position.

JOHN G. HOLIFER.
VICTOR S. LANDESS.